United States Patent
Omura

(10) Patent No.: US 6,229,656 B1
(45) Date of Patent: May 8, 2001

(54) COMPOUND LENS AND OPTICAL SYSTEM USING COMPOUND LENS

(75) Inventor: Ken Omura, Kanagawa-ken (JP)

(73) Assignees: Toshiba TEC Kabushiki Kaisha, Tokyo; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/321,829

(22) Filed: May 28, 1999

(30) Foreign Application Priority Data

Jun. 5, 1998 (JP) .................................................. 10-157321

(51) Int. Cl.$^7$ ............................ G02B 9/00; G02B 26/08; G02B 7/02
(52) U.S. Cl. ......................... 359/796; 359/204; 359/811
(58) Field of Search .................................... 359/796, 642, 359/710, 718, 17, 196, 201–202, 204–205, 212, 216–219, 811, 820

(56) References Cited

U.S. PATENT DOCUMENTS

| | | | | |
|---|---|---|---|---|
| 4,662,717 | * | 5/1987 | Yamada et al. | 359/811 |
| 4,690,512 | * | 9/1987 | Forsyth | 359/796 |
| 5,808,772 | * | 9/1998 | Yamaguchi et al. | 359/204 |

* cited by examiner

Primary Examiner—Georgia Epps
Assistant Examiner—Jordan M. Schwartz
(74) Attorney, Agent, or Firm—Foley & Lardner

(57) ABSTRACT

The compound lens is composed of a glass made lens that has a first curved surface portion and a synthetic resin made lens that has a second curved surface portion along the first curved surface portion of the glass made lens and is united in one body by press fitting this second curved surface portion to the first curved surface portion of the glass made lens.

17 Claims, 9 Drawing Sheets

COMPOUND LENS AND OPTICAL SYSTEM USING COMPOUND LENS

BACKGROUND OF THE INVENTION

1. Field of the Invention

The present invention relates to a compound lens and an optical system using the compound lens.

2. Description of the Related Art

A transfer type color image forming apparatus is equipped with multiple image forming units corresponding to separated color components and an optical scanner to provide image data corresponding to color components, that is, multiple laser beams to these image forming units.

The optical scanner has multiple semiconductor laser elements as light sources, a first lens group (a pre-deflection optical system) that narrows multiple laser beams emitted from these semiconductor laser elements to a specified diameter, an optical deflector that continuously reflects the multiple laser beams narrowed by the first lens group in the direction orthogonal to the conveying direction of a recording medium, a second lens group (a post-deflection optical system) that focuses the laser beams deflected by this optical deflector at a specified position of a recording medium and so forth.

Further, in many cases the direction in which laser beams are deflected by the optical deflector is regarded as the main scanning direction and the direction orthogonal to the recording medium conveying direction, that is, the direction orthogonal to the main scanning direction is regarded as a sub-scanning direction.

By the way, for instance, when a glass cylinder lens is used in the pre-deflection optical system and a plastic lens is used in the post-deflection optical system, a color distortion is produced as the refractive index of the plastic lens is changed by temperature and humidity.

So, the color distortion is corrected by providing two sheets of plastic lenses to the focusing lens system of the post-deflection optical system by considering the change in refractive index by temperature and humidity.

However, this correcting method has no problem when the resolution is low but when the resolution is made high, the color distortion must be corrected by the post-deflection lens only and therefore, there was such a problem that a plastic lens becomes in complicated shape and the color distortion in the sub-scanning direction cannot be corrected completely.

So, an optical scanner is considered, that is capable of correcting a color distortion by providing a plastic lens in the pre-deflection optical system.

In his method, however, as two sheets of lenses are arranged at separated positions in the pre-deflection optical system, unless the optical axes of two lenses are in accord with each other, the beams are inclined and as a result, a desired beam shape cannot be obtained on an image surface. Therefore, there was such a trouble that a time is needed for an adjusting work that becomes necessary to bring the optical axes of two lenses in accord with each other.

SUMMARY OF THE INVENTION

It is an object of the present invention to provide multiple lenses that are used in an optical system and capable of obtaining a desired beam shape.

It is another object of the present invention to provide an optical system that is capable of obtaining a desired beam shape without requiring the adjustment of optical axes of lenses provided in the pre-defection optical systems for correcting color distortion.

According to the present invention, a compound lens is provided, which comprises: a glass made lens having a first curved surface portion, and a synthetic resin made lens having a second curved surface portion along the first curved surface portion of the glass made lens and the second curved surface portion being press fitted to the first surface portion of the glass made lens to unit them in one body.

Further, according to the present invention, an optical system is provided, which comprises: a light source to generate a light beam; a conversion lens to convert the light beam generated from the light source into a parallel light or a focusing light; an optical deflection means for reflecting and deflecting the light beam converted by the conversion lens toward a scanning object; a focusing lens to focus the light beam reflected by the optical deflection means on a surface of the scanning object; a glass made lens provided between the conversion lens and the optical deflection means, the glass made lens having a first curved surface portion; and a synthetic resin made lens having a second curved surface portion along the first curved surface portion of the glass made lens and the second curved surface portion is united with the first curved surface portion of the glass made lens in a united body.

DETAILED DESCRIPTION OF THE PREFERRED EMBODIMENTS

Hereinafter, the present invention will be described referring to an embodiment shown in the attached drawings.

Figure 1:
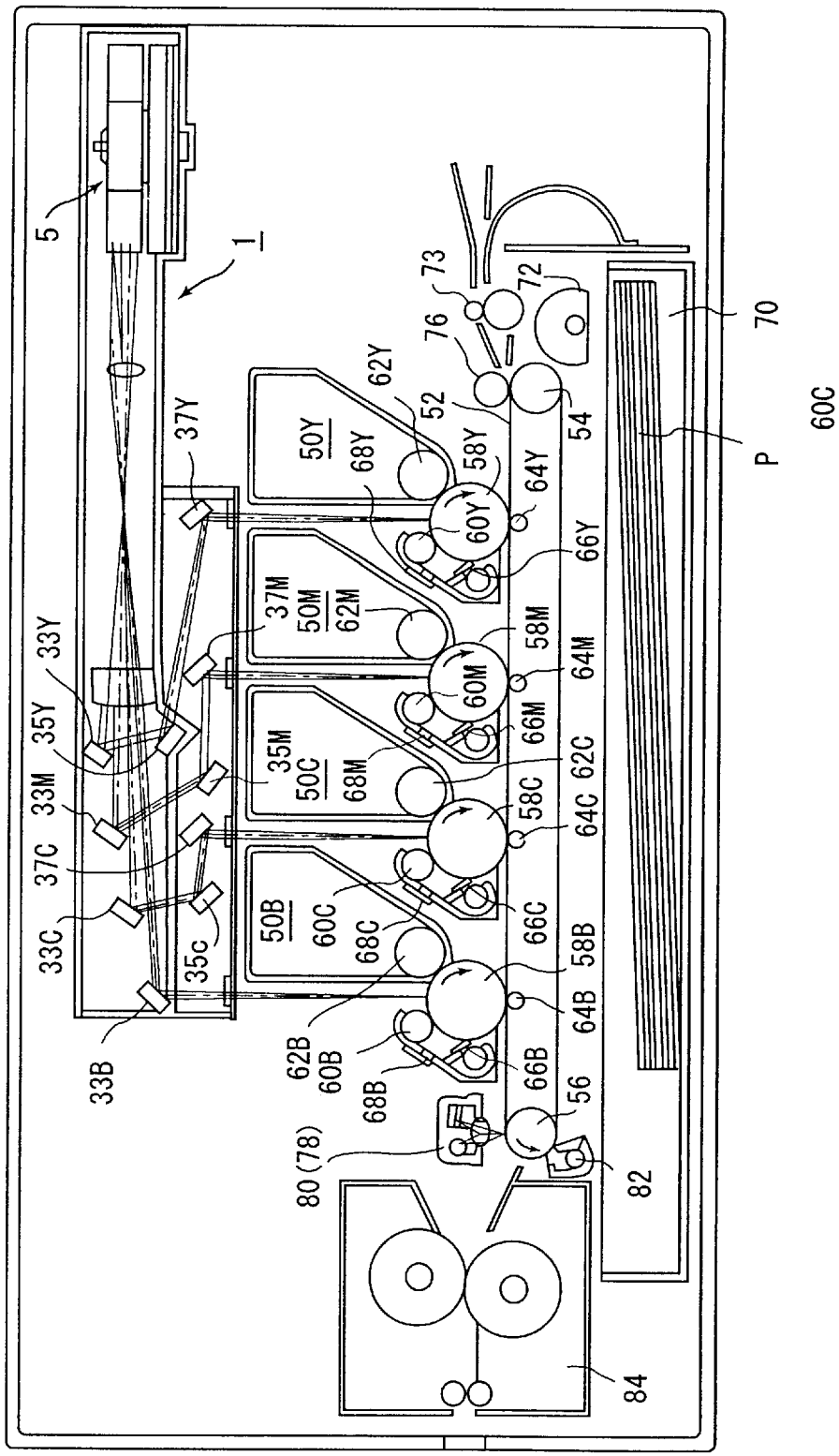
FIG. 1 is a schematic diagram showing one example of an image forming apparatus to which an optical system of the present invention is applied.

FIG. 1 shows a transfer type color image forming apparatus using a multi-beam optical scanner that is a preferred embodiment of the present invention. Further, this type of color image forming apparatus normally uses image data separated in 4 kinds of color components, that is, Y of yellow, M of magenta, C of cyan and B of black and 4 sets of various units that form images corresponding to Y, M, C and B and therefore, image data of color components and corresponding units are identified with Y, M, C and B suffixed to respective reference numerals.

As shown in FIG. 1, an image forming apparatus 100 has a first through a fourth image forming units 50Y, 50M, 50C and 50B that form an image for every separated color component, that is Y, N, C and B.

The image forming units 50Y, 50M, 50C and 50B are arranged in series in order under an multi-beam optical scanner 1 corresponding to positions where laser beams LY, LM, LC and LB corresponding to respective color component images are emitted via third mirrors 37Y, 37M, 37C and a first mirror 33B of the multi-beam optical scanner 1 that is described later using FIG. 2.

Under the image forming units 50Y, 50M, 50C and 50B, a conveyor belt 52 is arranged to convey a recording medium on which images are transferred from the image forming units 50Y, 50M, 50C and 50B. The conveyor belt 52 is put over a belt driving roller 56 and a tension roller 54 that are rotated by a motor (not shown) in the arrow direction and is rotated at a specified speed in the rotating direction of the belt driving roller 56.

The image forming units 50Y, 50M, 50C and 50B are formed in a cylindrical drum shape, able to rotate in the arrow direction and have photo-conductive drums 58Y, 58M, 58C and 58B that function as image carriers on which electrostatic latent images corresponding to images are formed.

Around respective photo-conductive drums 58Y, 58M, 58C and 58B, there are arranged main chargers 60Y, 60M, 60C and 60B, developing units 62Y, 62M, 62C and 62B, transferring units 64Y, 64M, 64C and 64B, cleaners 66Y, 66M and 66B, charge eliminators 68Y, 68M, 68C and 68B in order along the rotating direction of the photo-conductive drums 58Y, 58M, 58C and 58B.

The main chargers 60Y, 60M, 60C and 60B supply specified potential to the surfaces of the photo-conductive drums 58Y, 58M, 58C and 58B.

The developing units 62Y, 62M, 62C and 62B function as developing means to develop electrostatic latent images formed on the surfaces of the photo-conductive drums 58Y, 58M, 58C and 58B by supplying toner that are given colors corresponding to the formed electrostatic latent images.

The transferring units 64Y, 64M, 64C and 64B are opposed to the photo-conductive drums 58Y, 58M, 58C and 58B in the state where the conveyor belt 52 is put between the photo-conductive drums 58Y, 58M, 58C and 58B and transfer toner images formed on the photo-conductive drums 58Y, 58M, 58C and 58B on a recording medium, that is, a recording paper P conveyed by the conveyor belt 52.

The cleaners 66Y, 66M, 66C and 66B remove residual toner left on the photo-conductive drums 58Y, 58M, 58C and 58B after toner images are transferred by the transferring units 64Y, 64M, 64C and 64B.

The charge eliminators 68Y, 68M, 68C and 68B remove residual potential left on the photo-conductive drums 58Y, 58M, 58C and 58B after toner images are transferred by the transferring units 64Y, 64M, 64C and 64B.

Further, laser beams LY, LM, LC and LB combined from two beams that are guided by mirrors 37Y, 37M, 37C and 33B of the optical scanner 1 and become two beams in the sub-scanning direction on the photo-conductive drums 58Y, 58M, 58C and 58B are applied between the main chargers 60Y, 60M, 60C and 60B and the developing units 62Y, 62M, 62C and 62B, respectively.

Under the conveyor belt 52, there are arranged a paper cassette 70 that houses recording media, that is, paper P on which images formed by image forming units 50Y, 50M, 50C and 50B are transferred.

At one end of the paper cassette 70 close to the tension roller 54, a paper feed roller 72 that is formed nearly in a semicircular shape for taking paper P housed in the paper cassette 70 out of its top by one sheet at a time. Between the paper feed roller 72 and the tension roller 54, there is an aligning roller 74 to align the leading edge of a sheet of paper P with the top of a toner image formed on the photo-conductive drum 58Y of the first image forming unit 50Y.

Between the aligning roller 74 and the first image forming unit 50Y, near the tension roller 54, physically on the outer surface of the tension roller 54, an adsorbing roller 76 is arranged with the conveyor belt 52 put between to provide a specified electrostatic adsorbing force to the paper P conveyed at a specified timing via the aligning roller 72. Further, the axis of the adsorbing roller 76 and the tension roller 54 are arranged in parallel with each other.

At one end of the conveyor belt 52, near the belt driving roller 56, physically on the outer surface of the belt driving roller 56 with the conveyor belt 52 put between, registration sensors 78 and 80 for sensing the position of an image formed on the conveyor belt 52 or on the paper P conveyed by the conveyor belt 52 are arranged at a specified distance in the axial direction of the belt driving roller 56 (FIG. 1 is a front sectional view and the rear sensor 80 only is shown).

On the conveyor belt 52 corresponding to the outer surface of the belt driving roller 56, there is arranged a conveyor belt cleaner 82 to remove toner or refuse of paper P adhered on the conveyor belt 52. arranged to fix a toner image transferred on the paper P.

Figure 2:
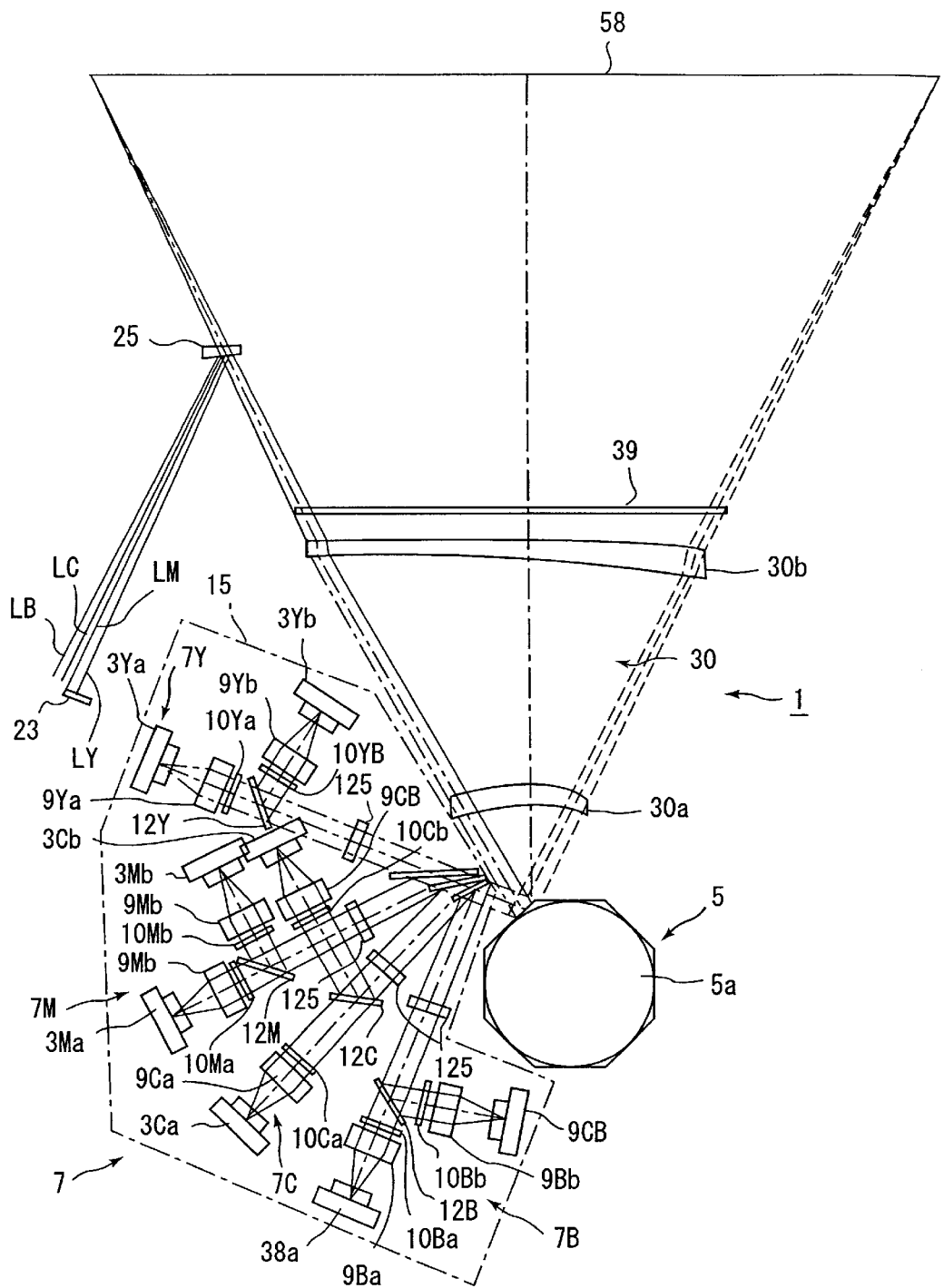
FIG. 2 is a plan view showing a multi-beam optical scanner to which the optical system of the present is applied.

FIG. 2 shows the multi-beam optical scanner 1. The multi-beam optical scanner 1 has an optical deflector 5 that is only one deflecting means to deflect the laser beam emitted from a laser element as a light source to image surfaces arranged at specified positions, that is, specified positions of the photo-conductive drums of the first through the fourth image forming units 50Y, 50M, 50C and 50B shown in FIG. 1 as a specified speed. Further, hereinafter, the direction of laser beam deflected by the optical deflector 5 is called the main scanning direction.

The optical deflector 5 has a polygon mirror 5a comprising multiple, for instance, 8 plane reflecting mirrors arranged in the regular polygonal shape and a motor (not shown) that rotates the polygon mirror 5a in the main scanning direction at a specified speed. The polygon mirror 5a is made of, for instance, aluminum. Further, each of the reflecting surfaces of the polygon mirror 5a is cut along the surface including the rotating direction of the polygon mirror 5a, that is, the surface orthogonal to the main scanning direction, that is, the sub-scanning direction and then, the surface protective layer of $SiO_2$, etc. is evaporated on the cut surfaces.

Between the optical deflector 5 and an image surface 58, there are provided a post-deflection optical system 30 comprising first and second focusing lenses 30a and 30b that give specified optical characteristic to the laser beam deflected in the specified direction by the reflecting surface of the optical deflector 5 and only one horizontal synchronization detector 23 to detect arrival of an individual beam of combined laser beams LY, LM, LC and LB emitted from the second focusing lens 30b of the post-deflection optical system 30 to a specified position before the area into which an image is written. Further, in front of the second focusing lens 30b, a dust-proof glass 39 is arranged. In addition, only one set of mirrors 25 to reflect part of combined 4×2 laser beams LY, LM, LC and LB passed through at least one sheet of lens that is described later in the post-deflection optical system 30 in directions differing from the main and sub-scanning directions toward the horizontal synchronization detector 23 is arranged between the post-deflection optical system 30 and the horizontal synchronization detector 23.

Next, the pre-deflection optical system provided between the laser element as the light source and the optical deflector 5 is described.

The optical scanner 1 has first through fourth light sources including two first and second laser elements (N1=N2=N3=N4=2) satisfying Ni (N is a positive integer) to generate laser beams corresponding to image data that are separated into color components.

The first through the fourth light sources have a first yellow laser 3Ya and a second yellow laser 3Yb to emit laser beams corresponding to Y, that is, yellow image, a first magenta laser 3Ma and a second magenta laser 3Mb to emit laser beams corresponding to M, that is, magenta image, a first cyan laser 3Ca and a second cyan laser 3Cb to emit laser beams corresponding to C, that is cyan image and a first black laser 3Ba and a second black laser 3Bb to emit laser beams corresponding to B, that is, black image.

Further, from respective laser elements, mutually paired first through fourth laser beams are emitted.

Between the laser elements 3Ya, 3Ma, 3Ca and 3Ba and the optical deflector 5, there are arranged 4 sets of pre-deflection optical systems 7Y, 7M, 7C and 7B to shape the sectional beam spots of laser beams from respective light sources 3Ya, 3Ma, 3Ca and 3Ba to specified shapes.

Further, the embodiment so far described pertains to the multi-beam optical scanner that is used for a color image forming apparatus. When modified, this optical scanner also can be used for a multi-beam optical scanner for a monochromatic high-speed printer or a monochromatic digital copying machine.

Figure 3:
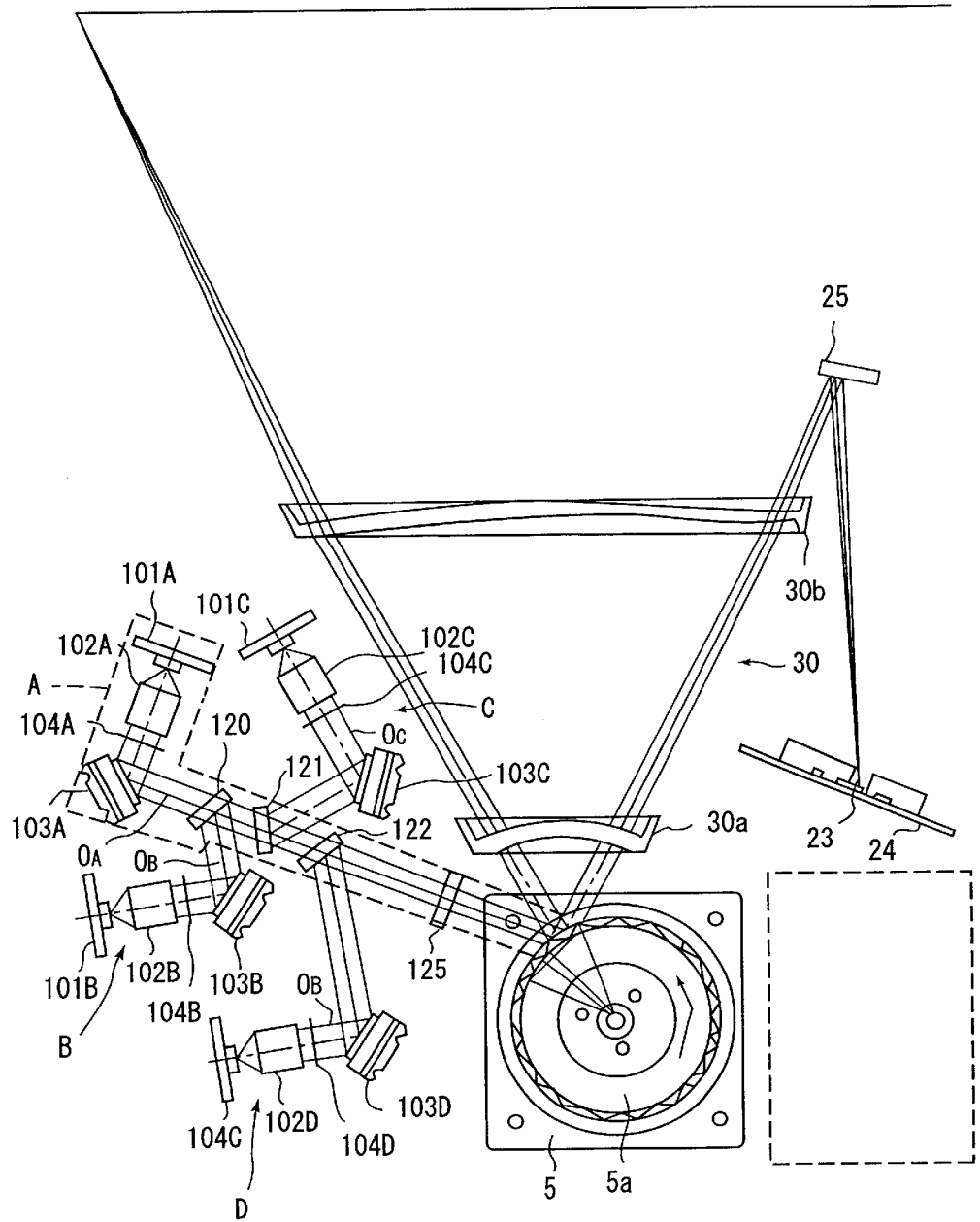
FIG. 3 is an optical system layout drawing of a multi-beam optical scanner to which the optical system of the present invention is applied.

FIG. 3 shows an optical layout drawing of a multi-beam optical scanner.

This multi-beam optical scanner uses one beam from the light source of the first yellow laser 3Ya shown in FIG. 2. A light source equivalent to the light source 3Ya is a first light source 101A shown in FIG. 3. The first light source 101A is the beam that becomes the reference and is called as a pre-deflection optical system A.

The laser beam generated from the first light source 101A is made to parallel light or focusing beam by a finite lens 102A and after shaped to a desired beam diameter by a first aperture 104A, reflected on a first galvano-mirror 103A that enables the laser beam position control, passes through half mirrors 120, 121 and 122 and further, passes through a hybrid cylinder lens 125 that is a compound lens described later, and led to the polygon mirror 5a of the optical deflector 5.

The optical system subsequent to the polygon mirror 5a is normally called the post-deflection optical system and its structure is the same as that of the above-mentioned color multi-beam optical system described. A second light source 101B has the half mirror 120 arranged in the optical path of the optical system A that becomes the reference and is arranged at the same position that becomes the pre-deflection optical path length as the optical system A. Therefore, the same optical path (the optical path OB) is called the pre-deflection optical system B or the optical system B. Third and fourth light sources 101C and 101D are also arranged at positions where the pre-deflection optical path becomes equivalent to the pre-deflection optical system A through the half mirrors 121 and 122 (the optical paths OC and OD) and are called the pre-deflection optical system C, D or the optical system C, D, respectively.

In other words, the half mirrors 120, 121 and 122 are arranged at specified angles so that the optical path lengths of the pre-deflection optical system A become equal and the second through the fourth light sources 101B, 101C and 101D are arranged so that the optical path lengths become equal each other. As the laser beam positions are controlled by the galvano-mirrors 1003A, 103B, 103C and 103D, after passing through the half mirrors 120–122, 4 laser beams on the optical paths OA, OB, OC and OD are led to the hybrid cylinder lens 125 as it becomes possible to provide a specified interval although slightly in the sub-scanning direction.

These 4 separated laser beams are reflected on the polygon mirror 5a, pass through the post-deflection optical system 30 and are applied to the image surface 58 at a desired interval. Further, a part of the laser beam passed through the second focusing lens 30b of the post-deflection optical system 30 is reflected on the mirror 25 and led to the horizontal synchronization detector 23. By obtaining horizontal synchronization signal by the horizontal synchronization detector 23 and feeding 4 laser beam signals back to the galvano-mirrors 103A, 103B, 103C and 103D, it becomes possible to control application of laser beams at a desired interval.

In this embodiment, a semiconductor laser, for instance, short wave laser of wavelength $\lambda$=680 nm is used as the light source 101. Further, a finite lens is used for the lens 102. The beam passed through the lens 102 is formed to a desired beam shape by the aperture 104.

Figure 5:
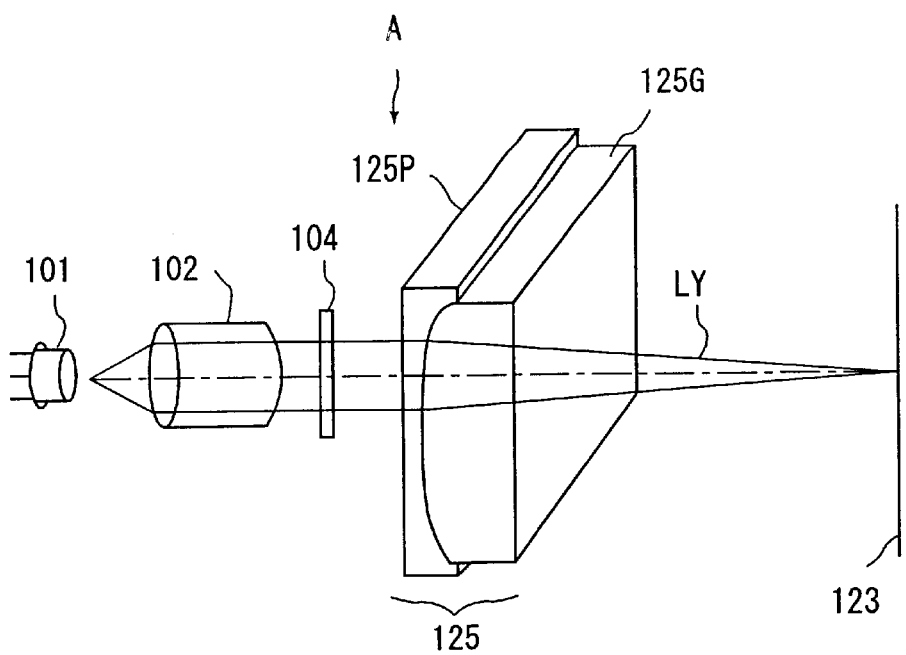
FIG. 5 is a diagram showing the arranged structure of light sources, lenses, an apertures and a hybrid cylinder lens.

FIG. 5 is a drawing showing the pre-deflection optical system A from the light source 101 to the optical deflector 123 in the state where the galvano-mirror 103, the half-mirrors 120, 121 and 122 are omitted.

Figure 4:
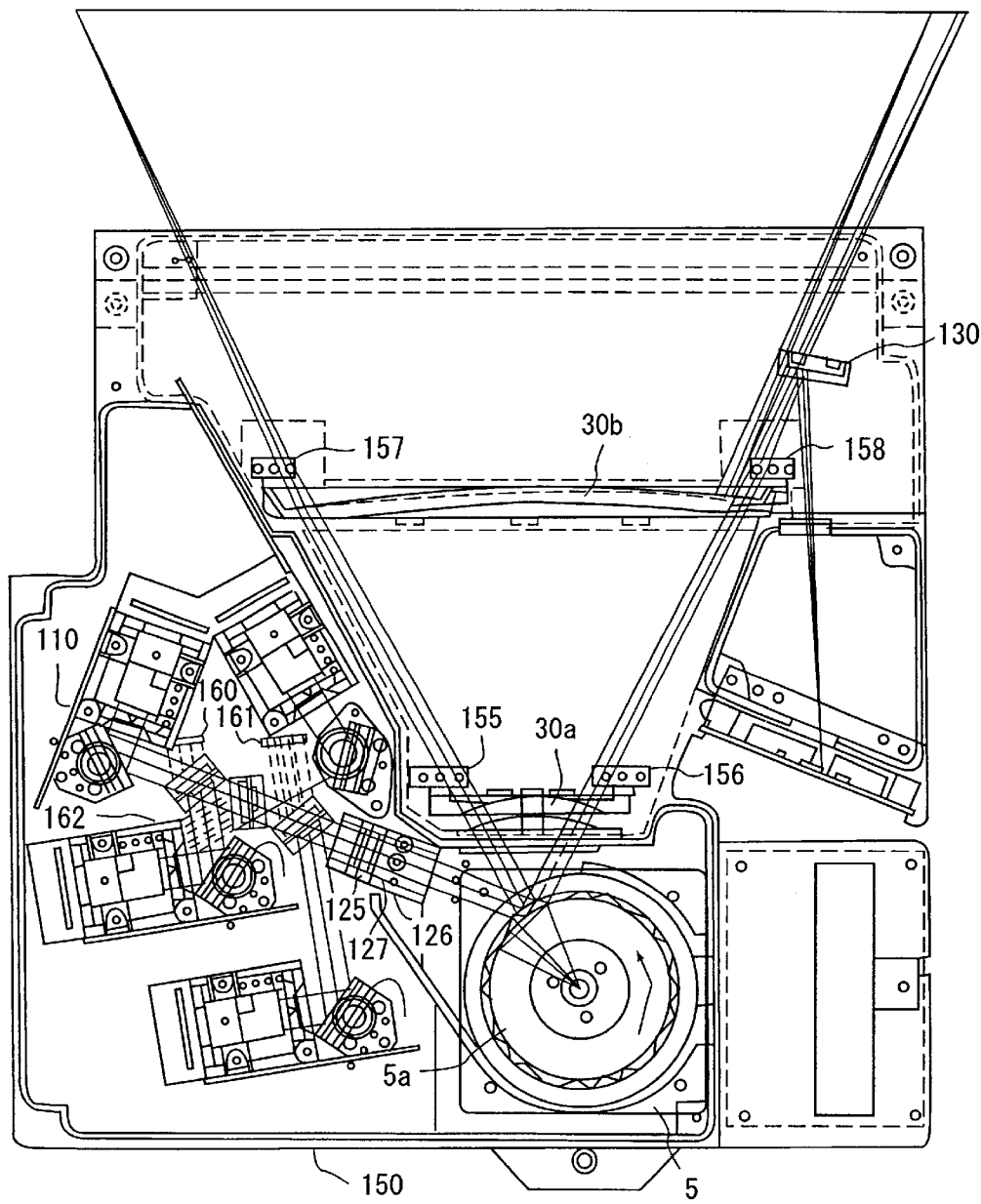
FIG. 4 is a plan view showing the mounting structure of an optical system to which the optical system of the present invention is applied.

The light source 101 is fixed directly to a laser holder (not shown) made of, for instance, aluminum die cast or plastic (for instance, PPS=polyphenylene sulfide) by a screw or a bonding agent. Further, the lens 102 and the aperture 104 are held in one unit in a lens holder (not shown). The laser holder is fixed to a housing 150 after adjusting the optical axis with the lens holder by a screw, etc. Further, the lens 102 is pressed down by a leaf spring (not shown) and fixed to the housing 150 by a bonding agent, etc. after adjusting the focus. A light generating unit 110 shown in FIG. 4 is thus constructed and is fixed to the housing 150 by a screw, etc. using a positioning member.

The hybrid cylinder lens 125 is to cancel the color distortion of the post-deflection optical system 30 and cancels the color distortion that is not cancelled only after the deflection in the sub-scanning direction.

Here, as shown in a conventional example, when two lenses are provided with a separate distance, if the optical axis between these lenses is not brought in accord with each other, a beam is inclined and a desired beam shape cannot be obtained on the image surface 58. Further, when a plastic lens is arranged individually, as the shape of plastic is not as accurate as a glass lens as a matter of course and it is not desirable.

So, in this embodiment the hybrid cylinder lens 125 as a composite lens is constructed with PMMA (polymethylmethacryl) plastic 125P and a glass lens 125G and the surface of the PMMA plastic lens 125P contacting the air is formed nearly in the plane surface.

Next, the manufacturing method and the positioning method of the hybrid cylinder lens 125 are described.

Figure 6:
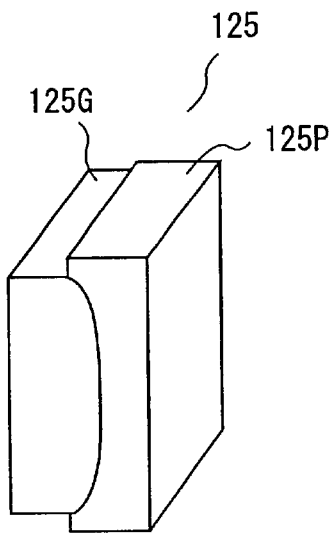
FIG. 6 is a perspective view showing another arranging example of the hybrid cylinder lens.

An optical system using a cylindrical lens is in the structure as described above and generally uses the curved surface at the incident side from the optical viewpoint. In this embodiment, the glass cylinder lens 125G, that has the power in the sub-scanning direction and affects the beam shape, is arranged at the incident side from the optical viewpoint. However, when it is inevitable to arrange the curved surface at the output side for some restriction, the description shown below may be taken conversely, that is, a hybrid cylinder lens may be arranged as shown in FIG. 6.

The plastic lens 125P and the glass lens 125G may be united in one body by bonding the output surface of the plastic lens 125P and the incident surface of the glass lens 125G or by putting a plastic lens over a glass lens. In the case where a plastic lens is put over a glass lens, there will be such a trouble that the glass may be broken due to the difference in cooling speeds of glass and plastic.

When taking a current environmental issue into consideration, as a lens that is formed by press fitting is hardly disassembled, it becomes necessary to cancel the press fitted or bonded portion as shown below.

Figure 7:
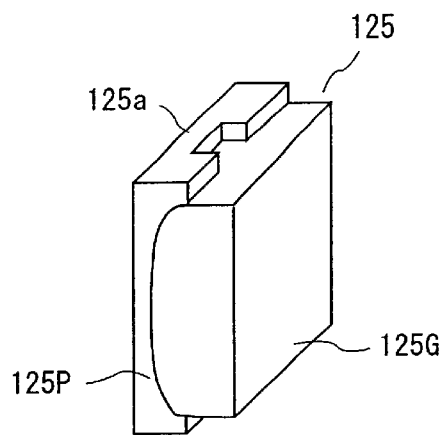
FIG. 7 is a perspective view showing the fitting/ releasing portion.
Figure 8:
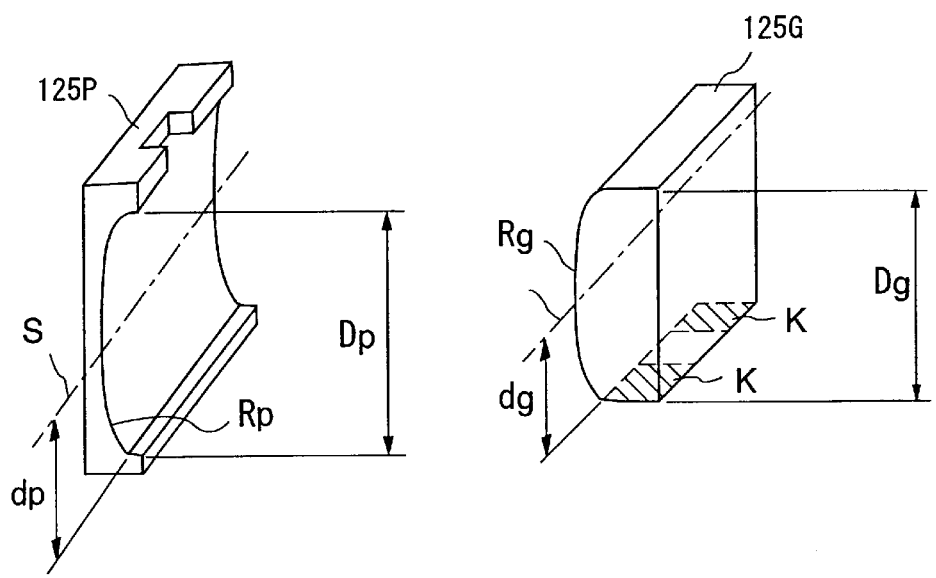
FIG. 8 is a perspective view showing the disassembled hybrid cylinder lens.
Figure 9:
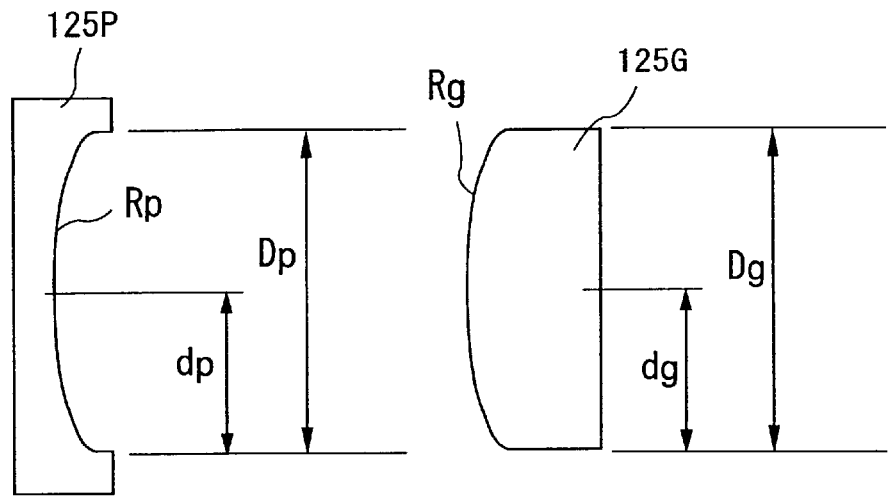
FIG. 9 is a side view showing the disassembled hybrid cylinder lens.

In this embodiment, a notch 125a is formed as a releasing portion on the top of the plastic lens 125P as shown in FIG. 7 and the compound lens can be disassembled by inserting a tool, etc. into the close fit surface of the glass lens 125G and the plastic lens 125P through the notch 125a. FIG. 8 and FIG. 9 are diagrams showing the disassembled plastic lens 125P and glass lens 125G. The glass lens 125G has the height Dg and a reference surface K for position is formed at the lower surface and the curved surface Rg is formed along the sub-scanning direction on the front and the height from the reference surface K to a principal axis S is dg. Similarly, the plastic lens 125P has a height of the fit portion Dp, a height from the reference surface to the principal axis dp and the curved surface in the sub-scanning direction Rp.

Theoretically, Rg=Rp but as the lens 125P is made of plastic, Rg does not agree with Rp when formed as a matter of course. At this time, when Dg is made larger than Dp (Dp<Dg), Rp of the plastic lens 125P adapts to Rg of the glass lens 125G when they are fitted and Rp becomes equal to Rg (Rp=Rg). In other words, the position of the principal axis becomes dg=dp and the composite lens becomes an optically precise product.

However, even when Dp becomes larger than Dg, if they are fitted with an excessively large pressure, the entirety of the plastic lens 125P is deformed and a desired accuracy cannot be obtained. The degree of press fit differs depending on size, material, etc. of lenses and is experimentally obtained.

By the way, as the glass lens 125G is normally processed by polishing, the surface of the reference surface K and the height of the principal axis S are precisely processed and it is therefore better to form the mounting reference surface K on the glass cylinder lens 125G. On the other hand, the plastic lens 125P is softer than the glass cylinder lens 125G and accuracy as high as the glass cylinder 125G is not obtained and therefore, it is an optimum method to put the plastic cylinder lens 125P over the glass cylinder lens 125G so as to bring Rp in accord with Rg and to make the principal axis of both lenses to the same position by adapting Rp to Rg. In view of the above, it is an optimum method to provide the mounting reference surface on the glass cylinder lens 125G and the reference of the plastic lens 125P to the glass lens 125G.

Figure 10:
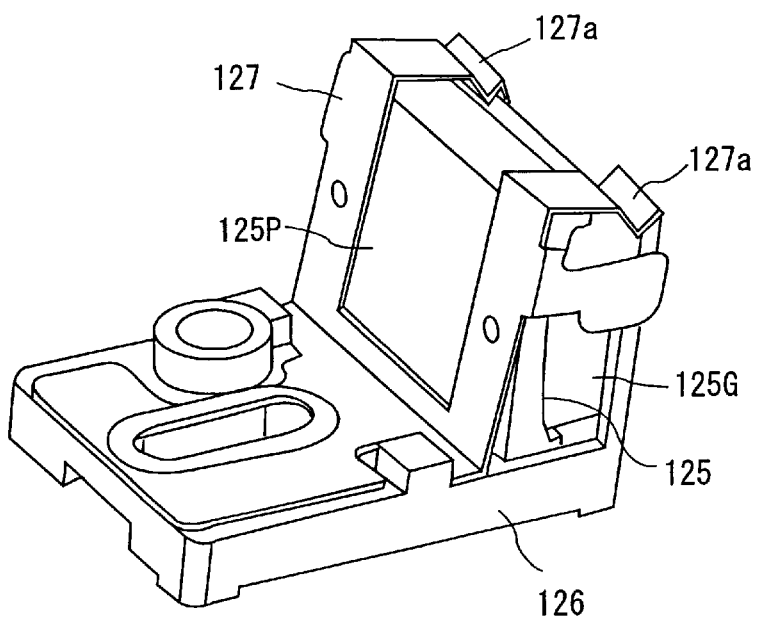
FIG. 10 is a perspective view showing the hybrid cylinder lens holder.
Figure 11:
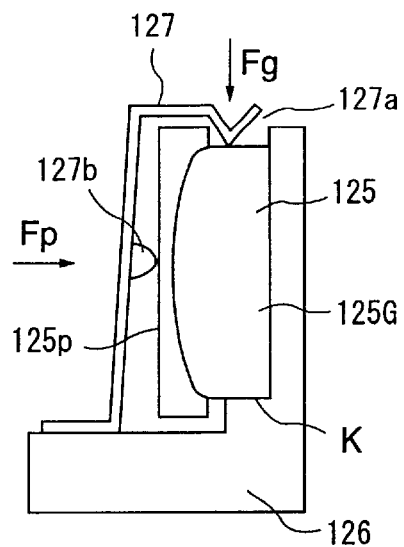
FIG. 11 is a side view showing the hybrid cylinder lens holder.

FIG. 10 is a perspective view showing the holder 126 of the hybrid cylinder lens 125 and FIG. 11 is its side view.

The holder 126 is provided with a leaf spring 127. At the top side of the leaf spring 127, a pair of first pressure portions 127a to press the glass lens 125G is provided and at the central portion, a pair of second pressure portions 127b to press the plastic lens 125P is provided. The leaf spring 127 positions and holds the reference surface K of the glass lens 125G by bringing it in contact with the holder 126 by pressing the top surface of the glass lens 125G to the optical axis vertically by the first pressure portions 127a and also, holds the glass lens 125G and the plastic lens 125P in the fit state by pressing both sides of the plastic lens 125P from the direction of optical axis by the second pressure portions 127b.

Further, if the plastic lens 125P is directly pressed by the leaf spring 127, the plastic lens 125P may come off the glass cylinder lens 125G and therefore, the leaf spring 127 holds the glass lens 125G by pressing it.

Further, a second pressing fore Fp against the plastic lens 125P is smaller than a first pressing force Fg against the glass lens 125G and it is only an object to reduce a burden to the plastic lens 125P and prevent it from coming off the glass lens 125G.

Figure 12:
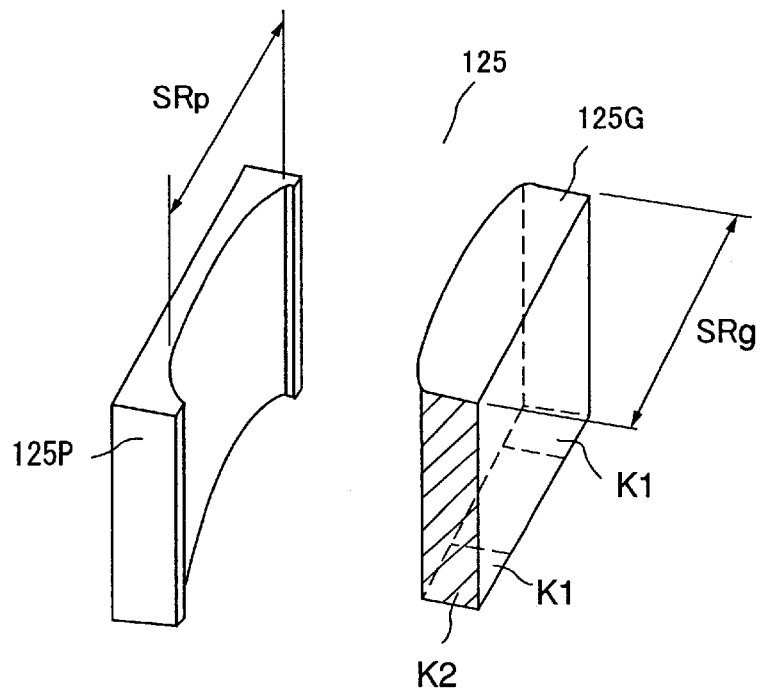
FIG. 12 is a perspective view showing another example of the hybrid cylinder lens.

FIG. 12 shows another embodiment of the hybrid cylinder lens 125.

In the above embodiment, the hybrid cylinder lens 125 that has a curvature in the sub-scanning direction is described. In this embodiment, the hybrid cylinder lens 125 that has a curvature in the main scanning direction is shown. That is, when the size of the glass lens 125G in the main scanning direction is SRg and that of the plastic lens 125P in the main scanning direction is SRp, both lenses are united into one body by bringing R in the main scanning direction in accord with each other by fitting them at SRp<SRg.

Further, when fitting the glass lens 125G and the plastic lens 125P in the main scanning direction, the guide surface K2 to guide the press fitting is so formed as to form an angle 90° against the mounting reference surface K1.

Figure 13:
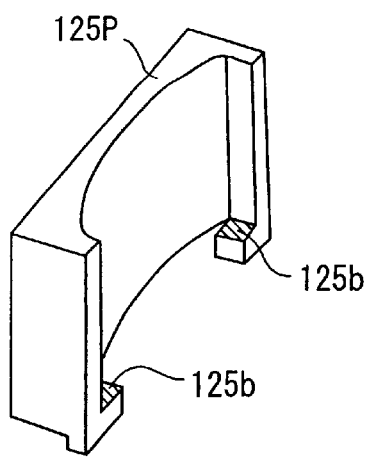
FIG. 13 is a perspective view showing a plastic lens.
Figure 14:
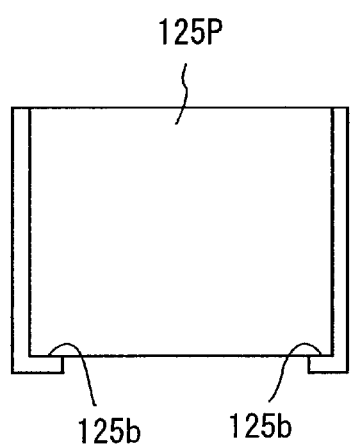
FIG. 14 is a front view showing the plastic lens shown in FIG. 13.

Further, when the glass lens 125G is a spherical or non-spherical lens, more higher fitting accuracy becomes necessary and therefore, projecting supporting portions 125b and 125b may be formed at both lower ends of the plastic lens 125P as shown in FIG. 13 and FIG. 14 and the optical axes of the plastic lens and the glass lens are brought in accord with each other by press fitting them with the reference surfaces K1 and K1 of the glass lens 125P brought in contact with these projecting supporting portions 125b and 125b.

Next, in FIG. 3 the functions of galvano-mirrors 103A, 103B, 103C and 103D are described.

In this embodiment, there are the galvano-mirrors 103A, 103B, 103C and 103D for 4 multi-beam optical systems and the pre-deflection optical system A that becomes the reference scans the first line on the image surface 58. On the other hand, the pre-deflection optical systems B, C and D scan the second, third and fourth lines, respectively. Here, if an ordinary reflecting mirror is used instead of the galvano-mirrors 103A, 103B, 103C and 103D, a space between the first line trough the fourth line cannot be controlled and when an image is formed, spaces between the lines in the sub-scanning direction become rough and fine and an image of good quality cannot be obtained.

The galvano-mirrors 103A, 103B, 103C and 103D are used in order to improve this point. The galvano-mirrors 103B, 103C and 103D of the pre-deflection optical systems B, C and D are controlled based on the galvano-mirror 103A of the pre-deflection optical system A.

In this optical system, the printing density is 600 DPI and 1 dot=42.3 µm and therefore, it is required to control the galvano-mirrors 103A, 103B, 103C and 103D so that the lines A and B become 2.3 µm and the lines A and C become 84.6 µm and the lines A and D become 126.9 µm on the image surface 58. To achieve this control, the horizontal synchronization detector 23 is arranged at the positions of nearly equivalent distance of the image surface after passing the post-deflection optical system 30. The horizontal synchronization detector 23 is arranged at intervals of about 42.3 µm in the sub-scanning direction and further, shifted in the beam scanning direction.

The horizontal synchronization detector 23 is split into two parts and when the laser beam passed over the horizontal synchronization detector 23, the center of beam power is measured and if it is out of center, the galvano-mirror 103 is moved to control the beam so that the center of beam will pass through the center of the horizontal synchronization detector 23.

Further, 4 position sensors are provided in one horizontal synchronization detector 23 and in case of 400 DPI, the interval of the position sensors becomes 63.5 µm. That is, needless to say, the number of sensors required according to the number of laser beams increase or decrease.

Generally, when the printing density is I and the number of beams is N, the number of required sensors becomes N and an interval of sensors becomes 25.4/I. The horizontal synchronization detector 23 is mounted on a base plate 24 and the position of the horizontal synchronization detector 23 is decided by adjusting the base plate 24. The galvano-mirror 103 is composed of a galvano-mirror portion and a holder portion that are formed on one unit by screws and is positioned and fixed on the housing 150.

Further, it is possible to use such a motor as an ultrasonic motor as a driving means of the galvano-mirror 103.

When half-mirrors are arranged on the housing 150, excess quantity of light is cut by the half mirrors in order to make the output power of semiconductor lasers of the light source equal. This excess beam may possibly pass through the half mirrors and is irregularly reflected in the housing 150. When explaining this in connection with, for instance, the pre-deflection optical system B, only power needed is reflected on the half mirror 120 and unnecessary power is transmitted. Regarding its quantity of light, as the utility factor of the optical system becomes about 20% when the laser beam passes through the half mirror 120 and therefore, ⅕ of the beam generated from the light source passes the half mirror. When generating laser beam of 25 mW using a semiconductor laser of 30 mW of the light-source, the quantity of light of 5 mW of its ⅕ is irregularly reflected in the housing 150 and becomes the stray light and may adversely affect an image. To prevent this, stray light block walls 160, 161 and 162 are arranged as shown in FIG. 4. The stray light is cut by these block walls. However, if these walls are arranged at an angle 90° against the housing, its reflecting light also becomes the stray light and may adversely affect an image and it is necessary to incline them by more than 3°. These stray block walls are normally formed in one unit with the housing 150.

Next, the optical characteristics between the hybrid cylinder lens 125 and the post-deflection optical system 30 are described in detail.

The post-deflection optical system 30, that is, two sets of first and second focusing lens 30a and 30b are made of plastic, for instance, PMMA and it is known that as the ambient temperature changes between, for instance, 0° C. to 50° C., the refractive index n changes from 1.4876 to 1.4789. In this case, the focusing plane where the laser beams passed through the first and second focusing lenses 30a and 30b are actually focussed, that is, the focusing position in the sub-scanning direction fluctuates by about ±1.2 mm.

From this, when a lens made of the same material as the lens that is used in the post-deflection optical system 30 is installed in the pre-deflection optical system 7 shown in FIG. 3 at the optimized curvature, it is possible to suppress the fluctuation on the focusing plane generated with the change in the refractive index due to the temperature change to below ±0.5 mm (hereinafter, shown as "mm"). In other words, when compared with a conventional optical system comprising the pre-deflection optical system 7 using glass lenses and the post-deflection optical system 30 using plastic lenses, the chromatic aberration in the sub-scanning direction generated from the change in refractive index due to the temperature change of the lenses of the post-deflection optical system 30 can be corrected.

These lenses 30a and 30b of the post-deflection optical system can be fixed to the housing 150 using leaf springs 155 through 158 or directly bonded to the housing 150 using leaf springs as shown in FIG. 4.

Further, in this optical system, the mirror 25 is used to lead beams to the horizontal synchronization detector 23 for obtaining horizontal sync signal. The mirror 25 is bonded directly to the housing 150 or fixed with leaf springs, etc. The housing 150 can be design in a compact shape when the mirror 25 is arranged.

As mentioned above, according to this embodiment, as the plastic lens 125P is press fitted to the glass lens 125G, it is possible to bring the curved surfaces and the principal axes of the glass lens 125G and the plastic lens 125P in accord with each other and it becomes possible to arrange them without adjusting their optical axes.

Further, as the mounting reference surface K is provided to the precisely machined glass lens 125G and the plastic lens 125P is mounted based on the curved surface portion of the glass lens 125G, the glass lens 125G and the plastic lens 125P can be arranged without adjusting the individual position.

Further, as the curved surface portion of the plastic lens 125P is put along the curved surface portion of the glass lens 125G, the adhesion between the glass lens 25G and the plastic lens 125P is excellent and the optical characteristic is also not impaired.

As described in the above, the curved surface portion of a synthetic resin made lens is press fitted to the curved surface portion of a glass made lens and both of them are united into one body, it is possible to bring the curved surface portions and the principal axes of the glass made lens and the synthetic resin made lens in accord with each other and it becomes possible to arrange them without requiring the adjustment of the optical axes. Further, as the reference surface for mounting is formed on a glass lens and a synthetic resin lens is press fitted to the curved surface portion of a glass lens, it is possible to arrange them at a specified position without forming the reference surface for mounting on the glass lens and synthetic resin lens.

Further, as the curved surface portion of a synthetic resin lens is put over a glass lens along its curved surface portion, the adhesion between a glass lens and a synthetic lens is excellent and the optical characteristic is not impaired.

What is claimed is:

1. A compound lens comprising:
   a glass made lens having a first curved surface portion; and
   a synthetic resin made lens having a second curved surface portion along the first curved surface portion of the glass made lens and the second curved surface portion being press fitted to the first surface portion of the glass made lens to unite them in one body;
   wherein, a height of the glass made lens denotes Dg and a height of a fitting portion of the synthetic resin made lens denotes Dp, and when the second curved surface portion of the synthetic resin made lens is press fitted to the first curved surface portion of the glass made lens to unite them in one body, the synthetic resin made lens is formed with the correlation of Dp<Dg so that the shape of the second curved surface portion becomes the same as the shape of the first curved surface portion.

2. A compound lens according to claim 1, wherein the synthetic resin made lens has a fitting margin continued to the second curved surface portion, the fitting margin and the second curved surface portion being press fitted to the first curved surface portion of the glass made lens.

3. A compound lens according to claim 1, wherein the compound lens is integrated with an optical system that includes a light source and an optical deflecting means for reflecting and deflecting a light beam generated by the light source, wherein the first curved surface portion of the glass made lens has a curvature in a direction orthogonal to a deflection direction.

4. A compound lens comprising,
   a glass made lens having a first curve surface portion; and
   a synthetic resin made lens having a second curved surface portion along the first curved surface portion of the glass made lens and the second curved surface portion press fitted to the first surface portion of the glass made lens to unite them in one body;
   wherein the first curved surface portion of the glass made lens is formed along a first direction and a size of the glass made lens in the first direction denotes SRg, the second curved surface portion of the synthetic resin made lens is formed along the first direction and the size of the synthetic resin made lens in the first direction denotes SRp, and when the second curved surface portion of the synthetic resin made lens is press fitted to the first curved surface portion of the glass made lens to unite them in one body, the synthetic resin made lens is formed with the correlation of SRp<SRg so that the shape of the second curved surface portion becomes the same as the shape of the first curved surface portion.

5. An optical system comprising:
   a light source to generate a light beam;
   a conversion lens to convert the light beam generated from the light source into a parallel light or a focusing light;
   an optical deflection means for reflecting and deflecting the light beam converted by the conversion lens toward a scanning object;
   a focusing lens to focus the light beam reflected by the optical deflection means on a surface of the scanning object;
   a glass made lens provided between the conversion lens and the optical deflection means, the glass made lens having a first curved surface portion; and
   a synthetic resin made lens having a second curved surface portion along the first curved surface portion of the glass made lens and the second curved surface portion being press fitted to the first curved surface portion of the glass made lens to unite them in one body;
   wherein a height of the glass made lens denotes Dg, and a height of the fitting portion of the synthetic resin made lens denotes Dp, and when the second curved surface portion of the synthetic resin made lens is press fitted to the first curved surface portion of the glass made lens to unite them in one body, the synthetic resin made lens is formed with the correlation of Dp<Dg so that the shape of the second curved surface portion becomes the same as the shape of the first curved surface portion.

6. An optical system according to claim 5, wherein the synthetic resin made lens has a fitting margin continued to the second curved surface portion, the fitting margin and the second curved surface portion being press fitted to the first curved surface portion of the glass made lens.

7. An optical system according to claim 5, wherein the first curved surface portion of the glass made lens has a curvature in a direction orthogonal to a deflection direction.

8. An optical system according to claim 5, further comprising:
   a holding means for positioning and holding the glass made lens and the synthetic resin made lens that are united in one body with the glass made lens brought in contact with the synthetic resin made lens at a specified position.

9. An optical system according to claim 5, further comprising:
   a reference surface for positioning formed on the glass made lens that is united with the synthetic resin made lens in one body; and
   a holding means for holding the glass made lens and the synthetic resin made lens that are united in one body with the positioning reference surface formed on the glass made lens brought in contact with the synthetic resin made lens at a specified position.

10. An optical system according to claim 5, further comprising:
    a releasing portion configured to release the united state of the glass made lens and the synthetic resin made lens.

11. An optical system according to claim 5, further comprising:
    a supporting portion configured to bring the heights of optical axes of the glass made lens and the synthetic resin made lens in accord with each other by bringing the glass made lens in contact with the synthetic resin made lens.

12. An optical system according to claim 5, further comprising:
    a reference surface for positioning that is formed on the glass made lens and a guide surface to guide the press fitting of the synthetic resin made lens; and a supporting portion formed on the synthetic resin made lens to bring the heights of optical axes of the glass made lens and the synthetic resin made lens in accord with each other by bringing the reference surface of the glass made lens in contact with the synthetic resin made lens.

13. An optical system that includes a compound lens, comprising:

a light source to generate a light beam;

a conversion lens to convert the light beam generated from the light source into a parallel light or a focusing light;

an optical deflection means for reflecting and deflecting the light beam converted by the conversion lens toward a scanning object;

a focusing lens to focus the light beam reflected by the optical deflection means on a surface of the scanning object;

a glass made lens provided between the conversion lens and the optical deflection means, the glass made lens having a first curved surface portion; and a synthetic resin made lens having a second curved surface portion along the first curved surface portion of the glass made lens and the second curved surface portion is press fitted with the first curved surface portion of the glass made lens in a united body;

wherein the first curved surface portion of the glass made lens is formed along a first direction and a size of the glass made lens in the first direction denotes SRg, the second curved surface portion of the synthetic resin made lens is formed along the first direction and the size of the synthetic resin made lens in the first direction denotes SRp, and when the second curved surface portion of the synthetic resin made lens is press fitted to the first curved surface portion of the glass made lens to united them in one body, the synthetic resin made lens is formed with the correlation of SRp<SRg so that the shape of the second curved surface portion becomes the same as the shape of the first curved surface portion.

14. An optical system comprising:

a light source to generate a light beam;

a conversion lens to convert the light beam generated from the light source into a parallel light or a focusing light;

an optical deflection means for reflecting and deflecting the light beam converted by the conversion lens toward a scanning object;

a focusing lens to focus the light beam reflected by the optical deflection means on a surface of the scanning object;

a glass made lens provided between the conversion lens and the optical deflection means, the glass made lens having a first curved surface portion; and a synthetic resin made lens having a second curved surface portion along the first curved surface portion of the glass made lens and the second curved surface portion is united with the first curved surface portion of the glass made lens in a united body; and a holding means for elastically pressing and holding the glass made lens by pressing by a first pressing force from a vertical direction against its optical axis and the synthetic resin made lens by a second pressing force from the direction of the optical axis;

wherein the first pressing force is assumed to be FG and the second pressing force to be FP, and wherein FG>FP.

15. A method of making a compound lens, comprising:

providing a glass made lens having a first curved surface portion, said glass made lens having a height denoted by Dg;

providing a synthetic resin made lens having a second curved surface portion, wherein a height of a fitting portion of the synthetic resin made lens is denoted by Dp, wherein Dp<Dg; and press fitting the second curved surface portion of the synthetic resin made lens to the first curved surface portion of the glass made lens to unite them in one body, wherein a shape of the second curved surface portion becomes the same as a shape of the first curved surface portion.

16. The method according to claim 15, further comprising:

providing a mounting reference surface on the glass made lens.

17. The method according to claim 15, further comprising:

pressing the glass made lens with a first pressing force from a vertical direction against an optical axis of the glass made lens; and pressing the synthetic resin made lens by a second pressing force from the direction of the optical axis;

wherein the first pressing force is assumed to be FG and the second pressing force to be FP, and wherein FG>FP.

* * * * *